United States Patent [19]
Saito

[11] Patent Number: 5,819,161
[45] Date of Patent: Oct. 6, 1998

[54] TWO WAY RADIO SET UTILIZING A SINGLE OSCILLATOR

[75] Inventor: Shin Saito, Kanagawa, Japan

[73] Assignee: Sony Corporation, Tokyo, Japan

[21] Appl. No.: 558,730

[22] Filed: Nov. 16, 1995

[30] Foreign Application Priority Data

Nov. 21, 1994 [JP] Japan ..................................... 6-312717
Feb. 6, 1995 [JP] Japan ..................................... 7-041326

[51] Int. Cl.$^6$ .............................. H04B 1/40; H01Q 11/12
[52] U.S. Cl. ............................................. 455/86; 455/118
[58] Field of Search ................................ 455/76, 84, 86, 455/87, 118

[56] References Cited

U.S. PATENT DOCUMENTS 2,974,222  3/1961  Lawson ..................................... 455/84

FOREIGN PATENT DOCUMENTS 60-223233  11/1985  Japan ........................................ 455/86
2120906   12/1983  United Kingdom ..................... 455/86

Primary Examiner—Nguyen Vo
Assistant Examiner—Sam Bhattacharya
Attorney, Agent, or Firm—Jay H. Maioli

[57] ABSTRACT

A transmitter and a two-way radio set which can be made structurally much simpler and also which can reduce consumption current. A carrier is obtained by frequency-dividing an oscillation signal generated by an oscillator, and the first local signal and the second local signal are obtained on the basis of the oscillation signal generated by the oscillator. Therefore, the construction can be made simple as compared with the conventional system, and power consumption can be reduced.

12 Claims, 4 Drawing Sheets

TWO WAY RADIO SET UTILIZING A SINGLE OSCILLATOR

BACKGROUND OF THE INVENTION

1. Field of the Invention

The present invention relates to a transmitter and a two-way radio set and is applicable, for example, to a digital cordless telephone set.

2. Description of the Related Art

In some conventional digital cordless telephone sets, radio circuits are connected to make a call by TDD/FDMA (time division duplex/frequency division multiple access) system or TDD/TDMA (time division duplex/time division multiple access) system.

For example, in TDD/FDMA system digital cordless telephone sets, there is a representative digital cordless telephone set called CT-2, where the technical standards have been published by ETSI (European Telecommunication Standard Institute).

In the above digital cordless telephone set, the frequency band (864.15 to 868.05 [MHz]) used is frequency-divided at intervals of 100 [KHz] to ensure a plurality of communication channels, and also on a single communication channel, transmission and reception are alternately switched in time to perform communications. If, for example, data to be transmitted and received is voice data, transmission and reception will be alternately switched every 1 [ms]. In this case, a guard band of 3.5 [bit] is set between transmission and reception by standards to avoid the interference between transmission and reception.

Also, in the above digital cordless telephone set, ADPCM (adaptive differential pulse code modulation) based upon CCITT (Consultative Committee for International Telegraph and Telephone) has been used as a voice coding method, and band-limited frequency deviation modulation (for example, GMSK (Gaussian filtered minimum shift keying) is a typical example) has been used as a data modulating method.

Now, the above digital cordless telephone set is constructed, for example, by a circuit such as that shown in FIG. 1. As shown in FIG. 1, an orthogonal modulator 2 is provided in a digital cordless telephone set 1, by which GMSK-modulates transmission data. The orthogonal modulator 2 is constituted by mixers 3, 4 and an adder 5. Band-limited signals I and Q which correspond to transmission data, and carriers S1a and S1b of 150.05 [MHz] are input to the orthogonal modulator 2. The mixer 3 multiplies the I-signal and the carrier S1a and outputs the resultant signal to the adder 5. Likewise, the mixer 4 multiplies the Q-signal and the carrier S1b and outputs the resultant signal to the adder 5. The adder 5 adds the outputs of the mixers 3 and 4. In this way, the GMSK-modulated modulation signal S2 of 150.05 [MHz] is output from the orthogonal modulator 2. In this case, a phase shifter 6 is provided for generating carriers S1a and S1b each having a phase difference of 90° from a carrier S1 of 150.05 [MHz].

The modulation signal S2 is input to a mixer 7, in which the modulation signal is frequency-converted to a transmission signal S4 of 864.15 to 868.05 [MHz] (i.e., converted to a higher frequency) by means of a first local signal S3 of 714.1 to 718.0 [MHz] or 1014.2 to 1018.1 [MHz] which is supplied through a buffer 8. The transmission signal S4 is input through a transmission amplifier 9 to a BPF (band pass filter) 10, in which the unnecessary component is removed. After passing through a switch 11 and a BPF 12, the signal S4 is finally output from an antenna 13.

On the other hand, a receiving signal S5 received at the antenna 13 is input through the BPF 12, the switch 11, and a receiving amplifier 14 to a LPF (low pass filer) 15, in which unnecessary components are removed. Thereafter, the signal S5 is input to a mixer 16. The mixer 16 frequency-converts the receiving signal S5 to an intermediate frequency signal S6 of 150.05 [MHz] (i.e., converted to a lower frequency) making use of the first local signal S3 of 714.1 to 718.0 [MHz] or 1014.2 to 1081.1 [MHz] supplied through a buffer 17. The intermediate frequency signal S6 is output through a BPF 18 to a mixer 19. The mixer 19 frequency-converts the intermediate frequency signal S6 to a modulation signal S8 of 10.05 [MHz] by means of a second local signal S7 of 140 [MHz] generated by a crystal oscillator 20 of 28 [MHz] and a quintuple circuit 21, and then outputs the modulation signal S8 to a demodulator 22. Thus, the demodulator 22 demodulates data by demodulating the GMSK-modulated modulation signal S8.

The first local signal S3 described above is generated by a channel synthesizer 25 composed of a VCO (voltage-controlled oscillator) 23 and a PLL (phase-locked loop) 24. In this case, the channel synthesizer 25 generates the first local signal S3 based on a signal of 12.8 [MHz] output from a crystal oscillator 26.

Also, the carrier S1 described above is generated by frequency-dividing an oscillation signal S9 of 300.1 [MHz] generated by a synthesizer 29 composed of a VCO 27 and a PLL 28 by two. In this case, the synthesizer 29 generates the oscillation signal S9 of 300.1 [MHz] by means of the crystal oscillator 26.

As shown in FIG. 1, since the digital cordless telephone set 1 has a plurality of crystal oscillators 20, 26, a plurality of VCOs 23, 27, and a plurality of PLLs 24, 28, there arises the problems that its circuit is structurally complicated and its consumption current is increased. Further, if the circuit is thus structurally complicated, the areas of the parts become larger and therefore also there occurs the problem that the integration of the circuit is very difficult.

SUMMARY OF THE INVENTION

In view of the foregoing, an object of this invention is to provide a transmitter and a two-way radio set which can be made structurally much simpler and also can reduce power consumption.

The foregoing object and other objects of the invention have been achieved by the provision of a transmitter of the present invention, comprising: an oscillator for generating an oscillation signal of predetermined frequency; a frequency divider for frequency-dividing the oscillation signal to generate a carrier of predetermined frequency; an orthogonal modulator for orthogonally modulating predetermined transmission data on the basis of the carrier; a first frequency converter for frequency-converting a modulation signal output from the orthogonal modulator into an intermediate-frequency signal of predetermined frequency by means of a first local signal based on the oscillation signal; a synthesizer for generating a second local signal of desired frequency on the basis of the oscillation signal; and a second frequency converter for frequency-converting the intermediate-frequency signal to a transmission signal of desired frequency by means of the second local signal.

Further, the present invention provides a two-way radio set, comprising: an oscillator for generating an oscillation signal of predetermined frequency; a frequency divider for frequency-dividing the oscillation signal to generate a carrier of predetermined frequency; an orthogonal modulator for orthogonally modulating predetermined transmission data on the basis of the carrier; a first frequency converter for frequency-converting a modulation signal output form the orthogonal modulator into an intermediate-frequency signal of predetermined frequency by means of a first local signal based on the oscillation signal; a synthesizer for generating a second local signal of desired frequency on the basis of the oscillation signal; a second frequency converter for frequency-converting the intermediate-frequency signal to a transmission signal of desired frequency by means of the second local signal; and a receiving circuit for converting a received receiving signal to a signal of predetermined frequency by means of the second local signal to demodulate the receiving signal.

In the transmitter or two-way radio set, the carrier is obtained by frequency-dividing the oscillation signal generated by the oscillator, and the first and second local signals are obtained on the basis of the oscillation signal generated by the oscillator, so that the structure can be made simple as compared to conventional structure, and consumption current can be reduced.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
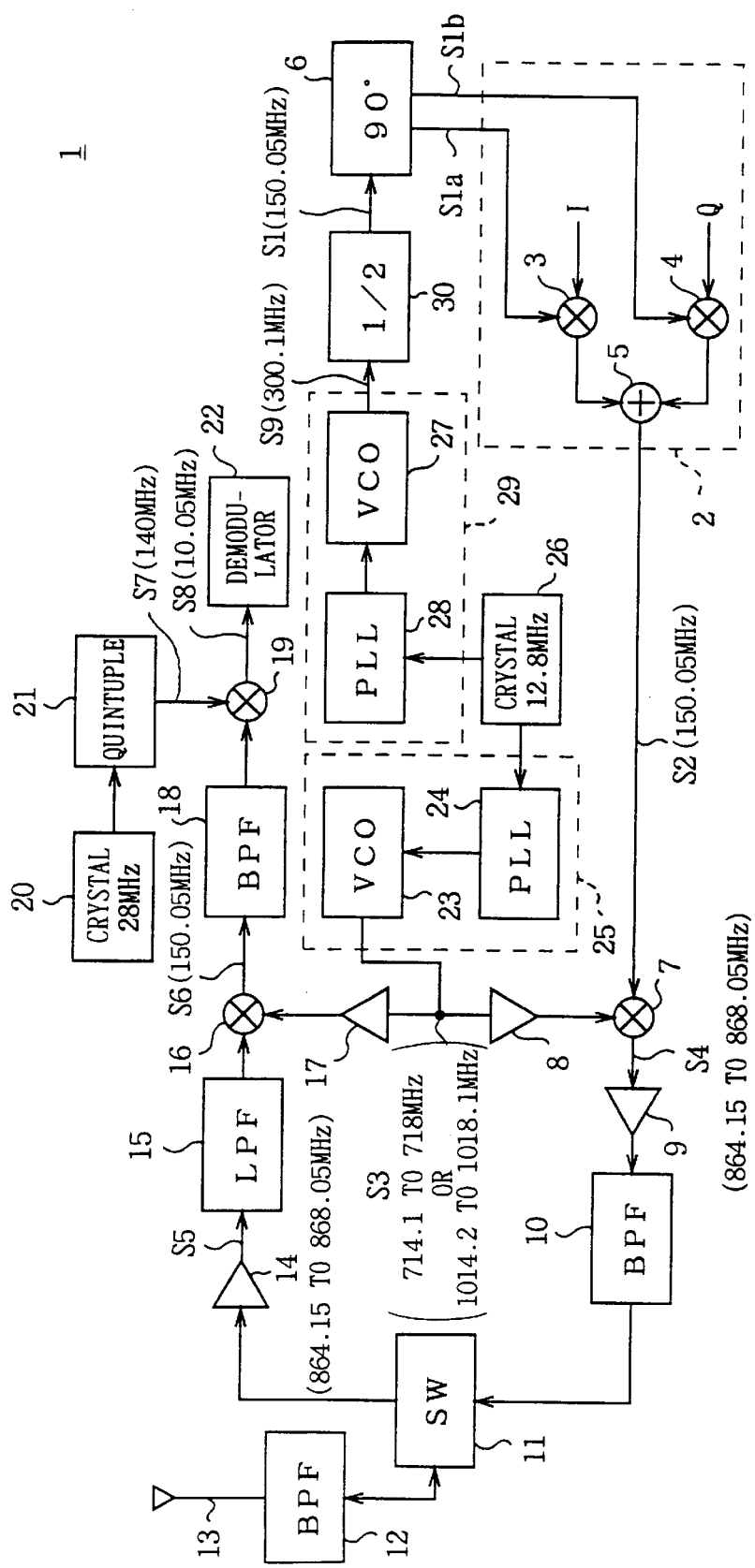
FIG. 1 is a block diagram showing the structure of a conventional digital cordless telephone set.
Figure 2:
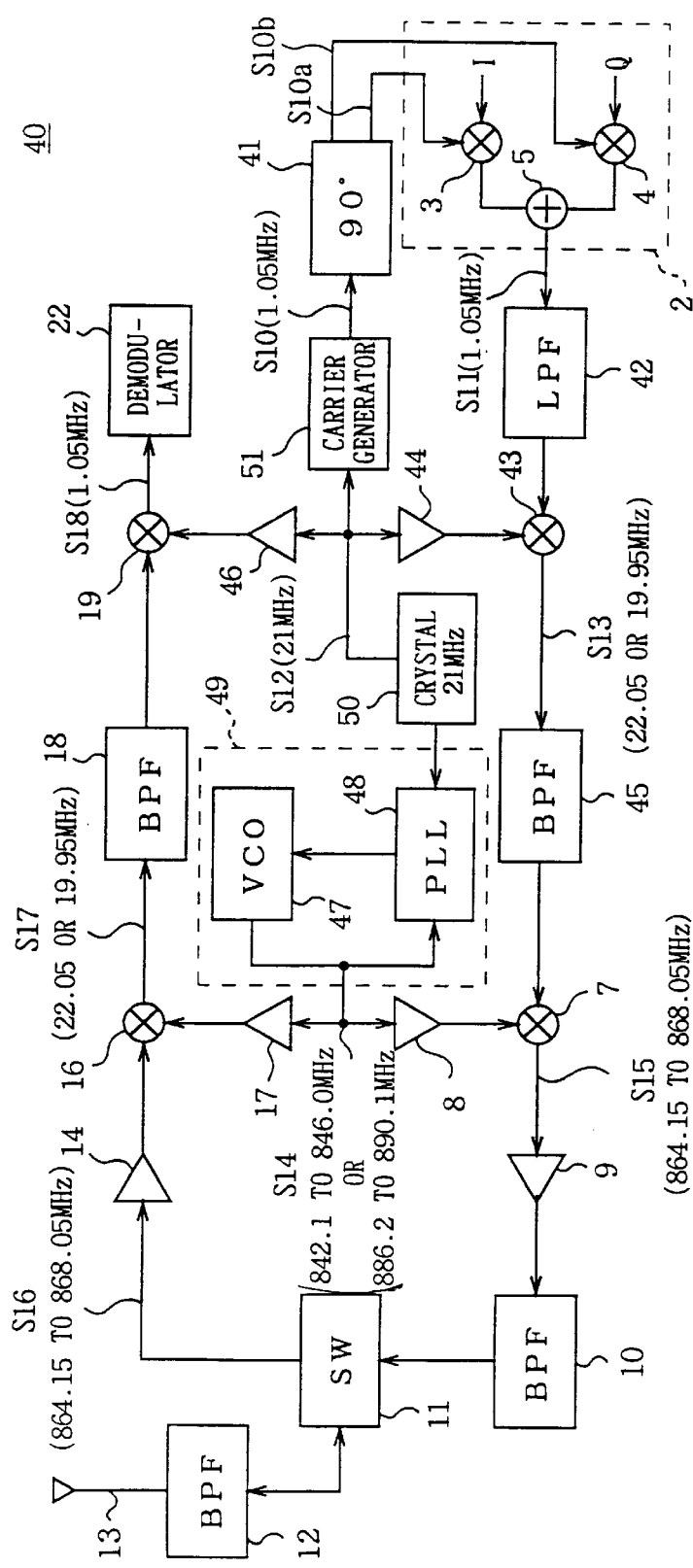
FIG. 2 is a block diagram showing the structure of a digital cordless telephone set according to an embodiment of the present invention.

Preferred embodiments of the present invention will be described with reference to the accompanying drawings:

In FIG. 2 where the same reference numerals are applied to corresponding parts with FIG. 1, 40 designates a CT-2 system digital cordless telephone set, in which an orthogonal modulator 2 modulates transmission data by GMSK same as the conventional system. In this embodiment, carriers S10a and S10b of 1.05 [MHz] are input to the orthogonal modulator 2, which generates a GMSK-modulated modulation signal S11 of 1.05 [MHz] from the carriers S10a, S10b, an I-signal and a Q-signal. Note that a phase shifter 41 is provided for generating carriers S10a and S10b each having a phase difference of 90° from a carrier S10 of 1.05 [MHz].

The modulation signal S11 is input to a simple primary or quadratic LPF (low pass filter) 42, in which the unnecessary component is removed. Thereafter, the modulation signal S11 is input to a mixer 43. The mixer 43 frequency-converts the modulation signal S11 to an intermediate-frequency signal S13 of 22.05 or 19.95 [MHz] (i.e., converted to a higher frequency) by means of a second local signal S12 of 21 [MHz] which is supplied via a buffer 44. The intermediate-frequency signal S13 is input to a BPF (band pass filter) 45, in which the unnecessary component is removed. Thereafter, the intermediate-frequency signal S13 is input to a mixer 7. The mixer 7 frequency-converts the intermediate-frequency signal S13 to a transmission signal S15 of 864.15 to 868.05 [MHZ] by means of a first local signal S14 of 842.1 to 846.0 [MHZ] or 886.2 to 890.1 [MHz] which is supplied via a buffer 8. This transmission signal S15 is input through a transmission amplifier 9 to a band pass filter 10, in which the unnecessary component out of the band region is removed. Thereafter, the transmission signal S15 is passed through a switch 11 and a BPF 12, and finally is transmitted from an antenna 13.

On the other hand, a receiving signal S16 received at the antenna 13 is input through the BPF 12 and the switch 11 to a receiving amplifier 14, which amplifies the receiving signal S16. Thereafter, the amplified signal S16 is input to a mixer 16. The mixer 16 frequency-converts the receiving signal S16 to an intermediate-frequency signal S17 of 22.05 or 19.95 [MHz] (i.e., converted to a lower frequency) by means of the first local signal S14 of 842.1 to 846.0 [MHz] or 886.2 to 890.1 [MHz] which is supplied through a buffer 17. The intermediate-frequency signal S17 is input to a BPF 18, in which the unnecessary component is removed. Thereafter, the intermediate-frequency signal S17 is input to a mixer 19. The mixer 19 frequency-converts the intermediate-frequency signal S17 to a modulation signal S18 of 1.05 [MHz] by a second local signal S12 of 21 [MHz] which is supplied through a buffer 46, and then outputs the modulation signal S18 to a demodulator 22 of the following stage. The demodulator 22 demodulates the modulation signal S18 by quadrature wave detection to demodulate data.

Incidentally, the buffers 8, 17, 44, and 46 are provided in order that the impedance variation at the time of the burst operation does not have an influence on a signal generation source.

The aforementioned first local signal S14 is generated by a channel synthesizer 49 composed of a VCO (voltage-controlled oscillator) 47 and a PLL (phase-locked loop) 48. In this case, the channel synthesizer 49 generates the first local signal S14 of 842.1 to 846.0 [MHz] or 886.2 to 890.1 [MHz] based on the oscillation signal of 21 [MHz] generated by a crystal oscillator 50 for reference.

Also, the oscillation signal of 21 [MHz] generated by the crystal oscillator 50 is used as the aforementioned second local signal S12. In addition, the aforementioned carrier S10 is generated by a carrier generator 51. In this case, the carrier generator 51 generates the carrier S10 of 1.05 [MHz] based on the second local signal S12 of 21 [MHz] generated by the crystal oscillator 50.

Thus, the first local signal S14, the second local signal S12, and the carrier S10 are generated based on the oscillation signal of 21 [MHz] generated by the crystal oscillator 50.

Figure 3:
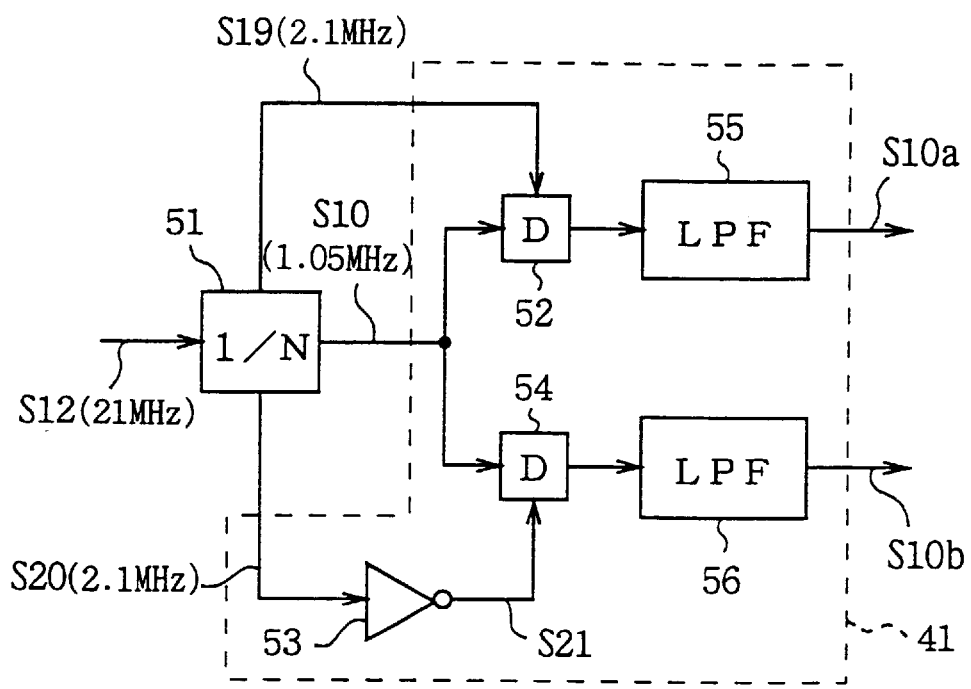
FIG. 3 is a block diagram showing the structure of a carrier generator and a phase shifter.

The carrier generator 51 and the phase shifter 41 are constituted by a circuit shown in FIG. 3. The carrier generator 51 is composed of a frequency divider constituted by a 1/N counter, as shown in FIG. 3, and generates the carrier S10 of 1.05 [MHz] by frequency-dividing the second local signal S12 of 21 [MHz] by twenty. The carrier generator 51 also generates clock signals S19 and S20 of 2.1 [MHz] by frequency-dividing the second local signal S12 by ten, and then outputs the clock signal S19 to a delay flip-flop (hereinafter referred to as a "D-FF") 52 of the phase shifter 41 and also outputs the clock signal S20 to an inverter 53 of the phase shifter 41. The inverter 53 inverts the clock signal S20 and outputs the resultant clock signal S21 to a D-FF 54.

The D-FF 52 latches the carrier S10 based on the clock signal S19, for example, the rising edge thereof, and outputs the latched output via a low pass filter 55. As a result, the carrier S10a is output from the low pass filter 55. On the other hand, the D-FF 54 latches the carrier S10 based on the clock signal S21, for example, the rising edge thereof, and outputs the latched output via a low pass filter 56. As a result, the carrier S10b is output from the low pass filter 56.

Note that, although the low pass filters 55 and 56 are provided in the phase shifter 41 for removing the higher harmonic components of the carriers S10a and S10b, there are some cases where the filters 55 and 56 are unnecessary depending upon a modulating method, and thus they are not always needed.

In this case, the frequency of each of the clock signals S19 and S21 is double the frequency of the carrier S10 and also the clock signals S19 and S21 are inverted with each other, so that the phase difference between the clock signals S19 and S21 is just 90° considering the carrier S10 as a reference. Therefore, the phase difference between the carrier S10a output from the D-FF 52 and the carrier S10b output from the D-FF 54 becomes 90° as well. In this way, the carriers S10a and S10b each having a phase difference of 90° are output from the phase shifter 41.

Now, a description will hereinafter be made of the frequency relationship among the signals. First, it is assumed that the oscillating frequency of the crystal oscillator 50 (i.e., frequency of the second local signal S12) is $f_1$, the frequency of the carrier S10 is $f_2$, the frequency of the intermediate-frequency signal S13 is $f_3$, the frequency of the first local signal S14 is $f_4$, and the frequency of the transmission signal S15 is $f_5$.

The frequency interval between communication channels is 100 [KHz] in the CT-2 method. Therefore, in the afore-mentioned structure, it is desirable that the oscillating frequency $f_1$ of the crystal oscillator 50 which becomes a reference clock of the apparatus is made to be n integral multiple of 100 [KHz]. Also, as a high-frequency circuit, it is desirable that the oscillating frequency $f_1$ is not multiplied, if possible. In addition, rendering the oscillating frequency $f_1$ divisible by an integer is desirable in order to realize the frequency divider (carrier generator 51) and the phase shifter 41 for generating the carrier S10. Furthermore, it is desirable that the oscillating frequency $f_1$ is made to be 25 [MHz] or less to constitute the channel synthesizer 49.

Moreover, considering that it is desirable that the transmission signal S15 is obtained by mixing the first local signal S14 and the intermediate-frequency signal S13, and, by standards, the frequency $f_5$ of the transmission signal S15 is given by the following equation:

$$f_5 = 864.05 + (N \times 0.1) [MHz]: N = 1 \text{ to } 40 \qquad (1)$$

and that the frequency $f_4$ of the first local signal S14 assume the maximum reference frequency 100 [KHz], the frequency $f_4$ of the first local signal S14 becomes an integer multiple of 100 [KHz], and the frequency $f_3$ of the intermediate-frequency signal S13 an odd number multiple of 50 [KHz]. That is, considering these facts, the following equations are established between the frequencies $f_1$, $f_2$, $f_3$, $f_4$, and $f_5$:

$$f_1 = m \times 100 \text{ [KHz]: "}m\text{" is an integer} \qquad (2)$$

$$f_2 = f_1 \times 1/n\text{: "}n\text{" is an integer} \qquad (3)$$

$$f_4 = x \times 100 \text{ [KHz]: "}x\text{" is an integer} \qquad (4)$$

$$f_3 = (2y+1) \times 50 \text{ [KHz]: "}y\text{" is an integer} \qquad (5)$$

$$f_3 = f_1 \pm f_2 \qquad (6)$$

$$f_5 = f_4 \pm f_3 \qquad (7)$$

For satisfying these frequency relationships, there exist frequencies such as those expressed, for example, by the following:

$$f_1 = 21 \text{ [MHz]} \qquad (8)$$

$$f_2 = 1.05 \text{ [MHz]} \qquad (9)$$

$$f_3 = 22.05 \text{ or } 19.95 \text{ [MHz]} \qquad (10)$$

$$f_4 = 842.1 \text{ to } 846.0 \text{ or } 886.2 \text{ to } 890.1 \text{ [MHz]} \qquad (11)$$

$$f_5 = 864.15 \text{ to } 868.05 \text{ [MHz]} \qquad (12)$$

Therefore, since the digital cordless telephone set 40 of the present invention meets these frequency relationships, the first local signal S14, the second local signal S12, and the carrier S10 can be generated from one single crystal oscillator 50.

With the construction described above, the oscillating frequency $f_1$ of the crystal oscillator 50 is set to 21 [MHz], and the channel synthesizer 49 generates the first local signal S14 of 842.1 to 846.0 [MHz] or 886.2 to 890.1 [MHz] based on the oscillation signal of 21 [MHz] which is output from the crystal oscillator 50. Also, the oscillation signal of 21 [MHz] output from the crystal oscillator 50 is used as the second local signal S12 as it is, and the carrier S10 of 1.05 [MHz] is generated by frequency-dividing the oscillation signal of 21 [MHz] by twenty.

Then, the transmission data is modulated by GMSK based on the carrier S10 obtained above, and the resultant modulation signal S11 is frequency-converted with the first local signal S14 and the second local signal S12 by means of a double conversion method to obtain a transmission signal S15 having the desired frequency (864.15 to 868.05 [MHz]).

Also, the receiving signal S16 of 864.15 to 868.05 [MHz] received by the antenna 13 is frequency-converted with the first local signal S14 and the second local signal S12 by means of a double conversion method to obtain the-a modulation signal S18, and the data is demodulated by demodulating the modulation signal S18.

As described above, the channel synthesizer 49 generates the first local signal S14 based on the oscillation signal output from the crystal oscillator 50, the oscillation signal is used as the second local signal S12. Furthermore, the carrier S10 is generated by frequency-dividing the oscillation signal by twenty. Therefore, the overall construction can be made simple as compared to the conventional systems. Also, since the number of circuits such as VCO and PLL is reduced, power consumption can be reduced. In addition, since the number of circuit parts is reduced, cost is reduced and circuit parts can be easily integrated.

In this case, the carrier generator 51 can be constituted with a simple frequency divider and also the phase shifter 41 can be simply constituted with a flip-flop and an inverter. Therefore, the carrier generator 51 or the phase shifter 41 can be easily stopped when a signal is received, and the interference of the carrier S10 to the receiving circuit can be reduced. Furthermore, since the output of the crystal oscillator 50 is used as a second local signal S12 as it is, the influence of the load variation caused by the mixers 19 and 43 can be made small as compared to a case where the second local signal S12 is generated by a VCO, etc.. In addition, since the frequencies of the intermediate-frequency signals S13 and S17 are rendered smaller than ever, the BPFs 18 and 45 do not have to be constituted with SAW filters and the construction can be simpler.

According to the foregoing construction, the first local signal S14 is generated based on the oscillation signal output from the crystal oscillator 50, the oscillation signal is employed as the second local signal S12, and furthermore the carrier S10 is generated by frequency-dividing the oscillation signal. Therefore, the construction can be made much simpler and consumption current can be reduced.

In the embodiment described above, the oscillating frequency $f_1$ of the crystal oscillator 50, the frequency $f_2$ of the carrier S10, the frequency $f_3$ of the intermediate-frequency signal S13, the frequency $f_4$ of the first local signal S14, and the frequency $f_5$ of the transmission signal S15 are set to the frequencies expressed by the equations (8) to (12). However, the present invention is not only limited to this, but other frequencies can be employed if the frequencies meet the equations (2) to (7). For example, the frequency $f_5$ of the transmission signal S15 can be set to the same value as indicated by the equation (12), and the oscillating frequency $f_1$ of the crystal oscillator 50, the frequency $f_2$ of the carrier S10, the frequency $f_3$ of the intermediate-frequency signal S13, and the frequency $f_4$ of the first local signal S14 may be set to the values indicated by the following:

$$f_1 = 18.4 \text{ [MHz]} \tag{13}$$

$$f_2 = 1.15 \text{ [MHz]} \tag{14}$$

$$f_3 = 19.55 \text{ or } 17.25 \text{ [MHz]} \tag{15}$$

$$f_4 = 844.6 \text{ to } 848.5 \text{ or } 883.7 \text{ to } 887.6 \text{ [MHz]} \tag{16}$$

Figure 4:
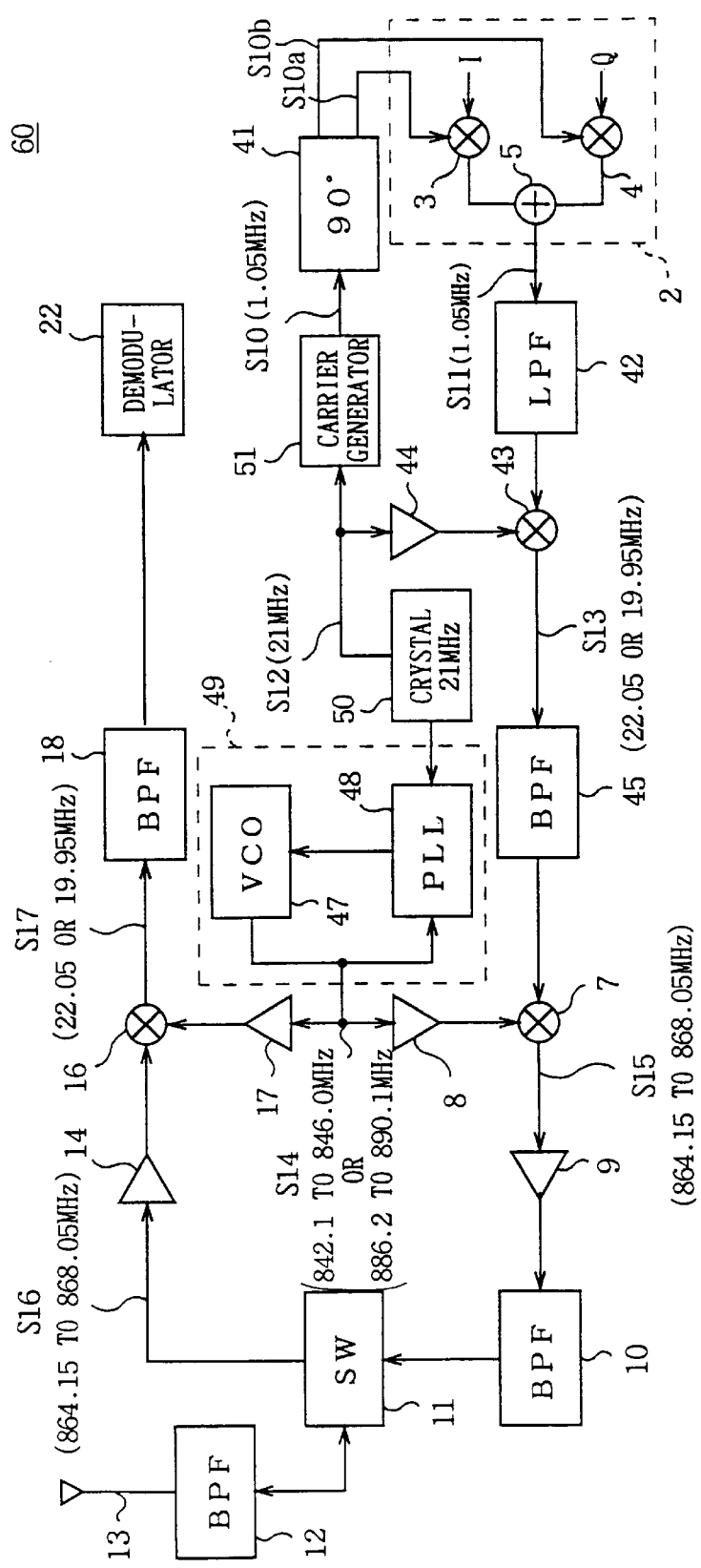
FIG. 4 is a block diagram showing the structure of a digital cordless telephone set according to another embodiment.

Also, in the embodiment described above, the signal receiving system is constituted with a double conversion method. However, the present invention is not only limited to this, but a digital cordless telephone set 60 can be constituted with a single conversion method, as shown in FIG. 4. With this arrangement, the number of mixers and buffers can be reduced and the construction can be made much simpler.

Incidentally, since the conventional circuit (FIG. 1) has the mixer 16 whose output is high such as 150.05 [MHz], demodulation has to be performed by means of a double conversion method. However, as shown in FIG. 4, when the output of the mixer 16 is low, the single conversion method can be enough to demodulate.

In addition, in the embodiment described above, the output of the crystal oscillator 50 is used as a second local signal S12. However, the present invention is not only limited to this, but the second local signal can be obtained by multiplying the output of the crystal oscillator 50.

Furthermore, in the embodiment described above, the use of the frequency band of the CT-2 system digital cordless telephone set 40 is 864.15 to 868.05 [MHz]. However, the present invention is not only limited to this, but, in the case of some other digital cordless telephone set different in frequency band and system, the same advantages as the foregoing case can be obtained if carriers or local signals are generated by a single oscillator, as described above. Furthermore, the present invention is not only limited to the digital cordless telephone set, but can be widely applicable to transmitters or two-way radio sets in which a signal modulated by a carrier of predetermined frequency is frequency-converted to a signal of predetermined frequency and transmitted.

According to the present invention described above, the carrier is obtained by frequency-dividing the oscillation signal generated by the oscillator, and the first and second local signals are obtained on the basis of the oscillation signal generated by the oscillator, so that the structure can be made simple as compared to conventional structure, and consumption current can be reduced. Therefore, a transmitter and a two-way radio set which can be made structurally much simpler and also which can reduce consumption current can be realized.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A transmitter comprising:
    a single oscillator for generating an oscillation signal of a first predetermined frequency, wherein said first predetermined frequency is an integer multiple of a quadrature modulation frequency;
    a frequency divider for frequency-dividing said oscillation signal to generate a carrier at said quadrature modulation frequency;
    an orthogonal modulator for orthogonally-modulating predetermined transmission data onto said carrier to generate a modulation signal;
    a first frequency converter for frequency-converting said modulation signal output from said orthogonal modulator to an intermediate-frequency signal of a second predetermined frequency by mixing said modulation signal with said oscillation signal at said first predetermined frequency;
    a synthesizer for generating, by frequency multiplication, a local signal of a third predetermined frequency on the basis of said oscillation signal, said third predetermined frequency being an integer multiple of said first predetermined frequency of said oscillation signal; and
    a second frequency converter for frequency-converting said intermediate-frequency signal to a transmission signal of desired a fourth predetermined frequency by mixing said second local signal with said intermediate frequency signal.

2. The transmitter according to claim 1 wherein the first predetermined frequency is less than 25 MHz.

3. The transmitter according to claim 1, wherein
    when the first predetermined frequency of said oscillation signal is $f_1$, the quadrature modulating frequency of said carrier is $f_2$, the second predetermined frequency of said intermediate-frequency signal is $f_3$, the third predetermined frequency of said local signal is $f_4$, and the fourth predetermined frequency of said transmission signal is $f_5$, the respective predetermined frequencies of said oscillation signal, said carrier, said intermediate-frequency signal, said local signal, and said transmission signal are selected so that frequency relationships are established as:
    f1=m×100 [KHz]: "m" is an integer
    fs=f1×1/n: is an integer
    f3=(2y+1)×50 [KHz]=f1+f2 : "y" is an integer
    f4=x×100 [KHz]: "x" is an integer
    f5=f4+f3.

4. The two-way radio according to claim 1 wherein the single oscillator is a crystal oscillator.

5. The transmitter according to claim 4 wherein the orthogonal modulator further comprises:
    a second signal divider for dividing the first oscillating signal by a first integer to generate a first modulation signal;
    a third signal divider for dividing the first signal by a second integer, the second integer being exactly twice the first integer, for generating a second modulation signal;
    an inverter for receiving the first modulation frequency signal and for generating an inverted first modulation signal;
    a first flip-flop for receiving the first and second modulation signals and for generating a first quadrature modulation signal; and a second flip flop for receiving the inverted first modulation signal and the second modulation signal and for generating a second quadrature modulation signal.

6. A two-way radio, comprising:

a single oscillator for generating an oscillation signal of a first predetermined frequency, wherein said first predetermined frequency is an integer multiple of a quadrature modulation frequency;

a frequency divider for frequency-dividing said oscillation signal to generate a carrier at said quadrature modulation frequency;

an orthogonal modulator for orthogonally-modulating predetermined transmission data onto said carrier to generate a modulation signal;

a first frequency converter for frequency-converting a modulation signal output from said orthogonal modulator to an intermediate-frequency signal of a second predetermined frequency by mixing said modulation signal with said oscillation signal at said first predetermined frequency;

a synthesizer for generating, by frequency multiplication, a local signal of a third predetermined frequency on the basis of said oscillation signal, said third predetermined frequency being an integer multiple of said first predetermined frequency of said oscillation signal;

a second frequency converter for frequency-converting said intermediate-frequency signal to a transmission signal of desired a fourth predetermined frequency by mixing said intermediate frequency signal with said local signal; and a receiving circuit for converting a received receiving signal to a signal of a fifth predetermined frequency by means of said second local signal to demodulate said receiving signal.

7. The two-way radio according to claim 6, wherein said receiving circuit includes means for again frequency converting and demodulating said signal whose frequency has been converted by means of said local signal by mixing with said oscillation signal.

8. The two-way radio according to claim 6 wherein the first predetermined frequency is less than 25 MHz.

9. The two-way radio according to claim 6, wherein when the first predetermined frequency of said oscillation signal is $f_1$, the orthogonal modulation frequency of said carrier is $f_2$, the second predetermined frequency of said intermediate-frequency signal is $f_3$, the third predetermined frequency of said second local signal is $f_4$, and the fourth predetermined frequency of said transmission signal is $f_5$, the respective predetermined frequencies of said oscillation signal, said carrier, said intermediate-frequency signal, said local signal, and said transmission signal are selected so that frequency relationships are established as:

f1=m×100 [KHz]: "m" is an integer f2=f1×1/n : "n" is an integer f3=(2y+1)×50 [KHz]=f1+f2: "y" is an integer f4=x×100 [KHz]: "x" is an integer f5=f4+f3.

10. The two-way radio according to claim 9, wherein said receiving circuit includes means for again frequency converting and demodulating said signal whose frequency has been converted by means of said second local signal by mixing with said oscillation signal.

11. The two-way radio according to claim 6 wherein the single oscillator is a crystal oscillator.

12. The two-way radio according to claim 11 wherein the orthogonal further comprises:

a second signal divider for dividing the first signal by a first integer to generate a first modulation signal;

a third signal divider for dividing the first signal by a second integer, the second integer being exactly twice the first integer, for generating a second modulation signal;

an inverter for receiving the first modulation frequency signal and for generating an inverted first modulation signal;

a first flip-flop for receiving the first and second modulation signals and for generating a first quadrature modulation signal; and a second flip flop for receiving the inverted first modulation signal and the second modulation signal and for generating a second quadrature modulation signal.

* * * * *

UNITED STATES PATENT AND TRADEMARK OFFICE
CERTIFICATE OF CORRRECTION

PATENT NO. : 5,819,161
DATED : Oct. 6, 1998
INVENTOR(S) : Shin Saito It is certified that error appears in the above-identified patent and that said Letters Patent is hereby corrected as shown below:

On the title page, under item [56] References Cited, insert the following:

U. S. PATENT DOCUMENTS

| EXAMINER INITIAL | PATENT NUMBER | ISSUE DATE | PATENTEE | CLASS | SUBCLASS | FILING DATE IF APPROPRIATE |
|---|---|---|---|---|---|---|
| | 4 2 4 6 5 3 9 | 01/20/81 | Haruki et al. | | | |
| | 5 1 6 3 1 5 9 | 11/10/92 | Rich et al. | | | |
| | | | | | | |

UNITED STATES PATENT AND TRADEMARK OFFICE
CERTIFICATE OF CORRRECTION

PATENT NO. : 5,819,161
DATED : Oct. 6, 1998
INVENTOR(S) : Shin Saito It is certified that error appears in the above-identified patent and that said Letters Patent is hereby corrected as shown below:

FOREIGN PATENT DOCUMENTS

| | | DOCUMENT NUMBER | | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|---|
| | | 0 | 5 | 2 | 9 | 7 | 6 | 7 | 03/03/93 | European | | | | |
| | | | | | | | | | | | | | | |

Signed and Sealed this

Thirteenth Day of April, 1999

*Attest:*

Q. TODD DICKINSON

*Attesting Officer*      Acting Commissioner of Patents and Trademarks